United States Patent [19]

Franckx

[11] 4,410,379
[45] Oct. 18, 1983

[54] METHOD OF MAKING A BRANCH-OFF SYSTEM

[75] Inventor: Joris R. I. Franckx, Bonheiden, Belgium

[73] Assignee: N.V. Raychem S.A., Belgium

[21] Appl. No.: 311,707

[22] Filed: Oct. 15, 1981

[51] Int. Cl.³ .......................... H01B 13/26; B32B 1/08
[52] U.S. Cl. ........................................ 156/54; 156/55; 156/86; 156/91; 174/72 C; 174/72 R; 174/74 A; 174/DIG. 8; 428/36; 428/913
[58] Field of Search ................... 24/73 C, 255 R, 256, 24/259 FS; 138/156–158; 156/47, 52, 86, 53, 54, 55, 91; 174/71 R, 72 R, 72 C, 74 A, DIG. 8; 428/36, 913

[56] References Cited

FOREIGN PATENT DOCUMENTS 1155470 6/1969 United Kingdom .
2019120 10/1979 United Kingdom .

Primary Examiner—Robert A. Dawson
Attorney, Agent, or Firm—Douglas A. Chaikin; Herbert G. Burkard

[57] ABSTRACT

A branch-off of at least two substrates leaving an end of a recovered sleeve is effected using a heat activatable sealant, and a thermally conductive member which has a fin-shaped protruberance by means of which heat can be conducted into the crutch region between the substrates to activate the sealant. The thermally conductive member can also function to urge together circumferentially spaced portions of the sleeve to define conduits for the substrates. This urging function can be supplemented or carried out totally by a separate clip.

8 Claims, 9 Drawing Figures

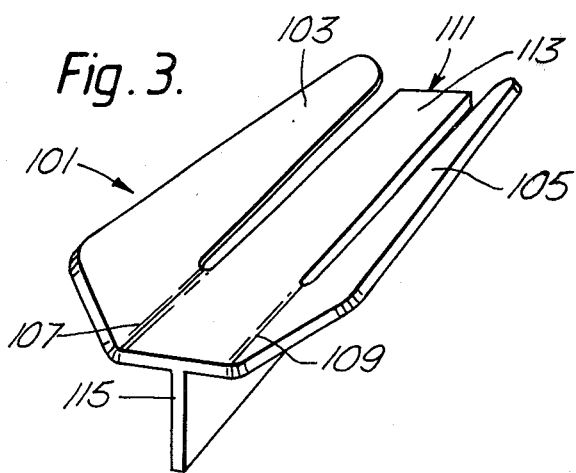
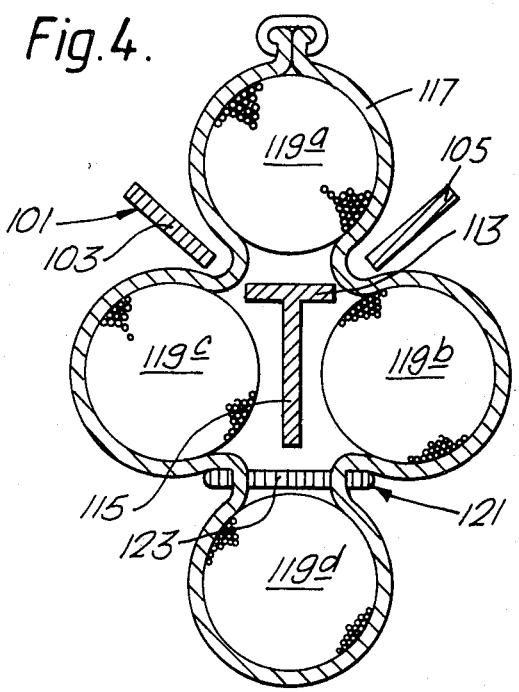

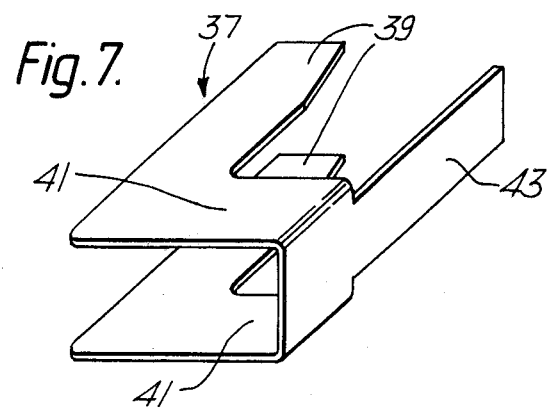
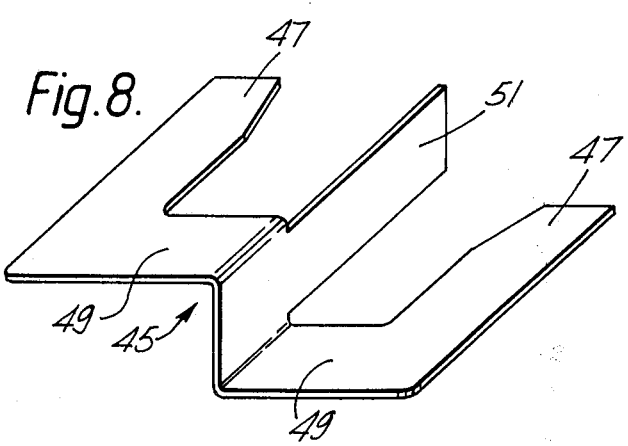
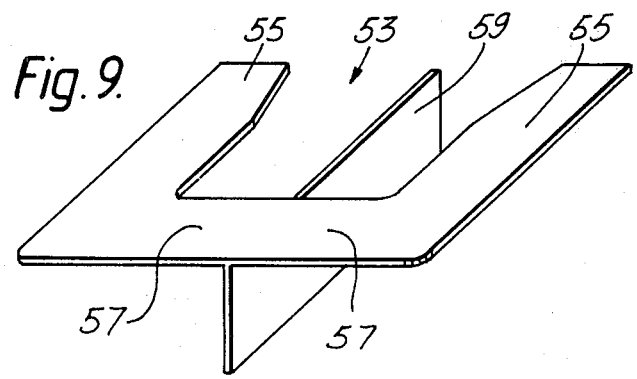

METHOD OF MAKING A BRANCH-OFF SYSTEM

DESCRIPTION

This invention relates to recoverable, for example heat-recoverable, articles and their use in protecting substrates, such as cables or pipes, and especially to sealing branch-offs of such substrates.

It is frequently necessary to protect substrates and it is well known for this purpose to use heat-recoverable articles made of cross-linked polymeric material.

In one form, such articles comprise a heat shrinkable sleeve that is positioned about a substrate and then heated to effect recovery, in this case causing the sleeve to shrink, to form a protective enclosure around the substrate. Such a sleeve may be in the form of a continuous cylinder which is slipped over one end of the substrate or in the form of a sheet which is wrapped around the substrate and retained by a closure means.

Heat-recoverable and wraparound sleeves of the type described above have been successfully employed in various applications. Where two or more substrates are to be protected at a branch-off, it is necessary, in order efficiently to seal the branch-off, to enclose the branch-off within the sleeve and also to effect sealing between the substrates. One method of sealing a branch-off between a sleeve and, for example, two substrates is to position a clip having at least two elongate legs over the end of the outer surface of the sleeve so that the legs of the clip urge together circumferentially spaced portions of the sleeve in such a way that two conduits are formed, each of which receives one of the substrates. This method is described and claimed in our co-pending British Application, Publication No. 2019120A. In a preferred embodiment of the clip described in the application, the clip has three legs arranged generally in a plane. Two legs are arranged two extend along the outer surface of the sleeve, and a third, central, leg is arranged to extend into the sleeve between the substrates. In further embodiments where a three or four substrate branch-off is required a clip similar to the three-legged clip described above is used, having, respectively, three or four outer legs and a central leg appropriately shaped to co-operate with the gap between the substrates.

The use of a clip to form a branch-off seal as described in British Application, Publication No. 2019120A has proved successful, especially in the case of a two substrate branch-off where the two-legged clip or the preferred three-legged clip is used. However, and especially where there are three or more substrates some difficulty may be encountered when using the clip of British Application, Publication No. 2019120A. For example, in the case of a four substrates branch-off, when the substrates are bunched together, it is seen that a rather complex shaped clip is proposed, that may be difficult to insert. Furthermore since the central crutch region, between the substrates, is relatively large and inaccessible compared to that in the two or three substrate branch-off it is more difficult to get an efficient seal, notwithstanding the fact that adhesive is disposed in that region.

One aspect of the present invention provides a thermally conductive member for use in sealing with a heat activatable sealant a branch-off between at least two substrates extending from an end a recoverable sleeve, the member comprising a first, generally fin-shaped portion that is positionable outside said sleeve, a second elongate portion that is arranged, in use, to extend into said end of the sleeve between the substrates, and a bridging portion that interconnects said first and second portions, wherein heat applied to said first portion is conducted by the bridging portion to said second portion to effect said seal.

The second portion of the thermally conductive member may be coated with the heat activatable sealant, such as a hot-melt adhesive, and is preferably shaped for co-operation with the gap between the substrates at the branch-off. This shaping may be of the material of the second portion, or of the sealant. Sealant may alternatively or additionally be provided separately within the sleeve.

Heat applied to the fin-shaped portion of the conductive member of the present invention is conducted by the bridging portion to the second portion within the sleeve, causing the sealant therein to melt and flow, or otherwise to be activated, between the substrates and seal the end of the sleeve. One of the advantages of this invention is that in most practical applications the heat applied to recover the sleeve is absorbed efficiently due to the shaping of the first portion and conducted to the inner elongate portion so that no, or little, additional heat is required to activate the sealant. Accordingly, scorching and burning of the sleeve which may result from such additional heating are avoided or at least minimised.

In a preferred embodiment of this invention the second portion and the bridging portion of the member are of generally planar construction.

One or more additional fin-shaped portions may be thermally connected to the second portion of the member to improve conduction of heat thereto.

The or each fin-shaped portion of the member may extend generally unidirectionally with the second portion.

When the second portion is itself generally planar, the or each fin-shaped portion may extend in a plane that is inclined, for example substantially perpendicular, to the plane of the second portion.

It will be appreciated that by suitable choice of the gap, preferably a substantially parallel channel, between the or each fin-shaped portion and the second portion of the member, or by provision of additional limbs, the thermally conductive member may itself provide clamping of the sleeve, or may serve to separate the substrates. The clamping of the sleeve referred to may be the securing of one thickness of the sleeve to a junction box around which the outgoing cables are distributed, but will more commonly be the holding together of circumferentially spaced portions of the sleeve between pairs of outgoing cables. Where said portions of sleeve are held together, they need not touch, and in general they will not touch, the gap being filled with a sealant and with the second portion of the member.

A further aspect of the present invention provides an assembly for sealing with a heat activatable sealant a branch off between at least two substrates, comprising a recoverable sleeve positionable around said substrates such that said substrates extend from one end thereof, and a thermally conductive member comprising a first, generally fin-shaped portion that is positionable outside said sleeve, a second elongate portion that is arranged, in use, to extend into said end of the sleeve between the substrates, and a bridging portion that interconnects said first and second portions, wherein heat applied to said first portion is conducted by the bridging portion to said second portion to effect said seal.

The assembly may additionally comprise a clip having two elongate legs that are positionable over the outer surface of the sleeve at said end thereof to hold circumferentially spaced portions of the sleeve towards each other to form conduits for receiving said substrates. Thus, this urging function to form conduits for the substrate may be carried out by the thermally conductive member itself, where necessary, or it may be supplemented by the clip defined. The clip is preferably as described and claimed in our co-pending British Application, Publication No. 2019120A, the disclosure of which is herein incorporated. When we refer to the clip or conductive member forming the conduits, we do not exclude the case where the recoverable sleeve is itself shaped to define two or more conduits at an end thereof; in such a case the clip or conductive member will be required to maintain the conduits as the sleeve changes size during recovery.

A still further aspect of the present invention provides a method of sealing with a heat-activatable sealant a branch-off between at least two substrates extending from an end of a recoverable sleeve, comprising positioning a thermally conductive member at said end of the sleeve such that a first, generally fin-shaped portion of the member is located outside the sleeve, and a second portion thereof, that is thermally connected to said first portion, extends within the sleeve between the substrates, and applying heat to said fin-shaped portion for conduction to said second portion to activate said sealant and to effect sealing of the substrates within the sleeve.

Embodiments of the present invention will now be described by way of example only with reference to the accompanying drawings, wherein:

FIGS. 3 and 5 are isometric views of second and third embodiments of thermally conductive member;

Figure 5:
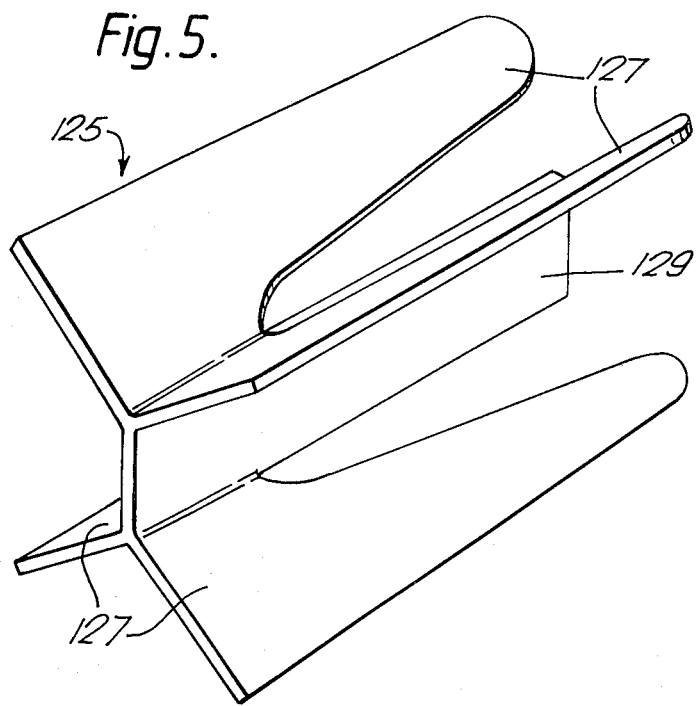
Figure 6:
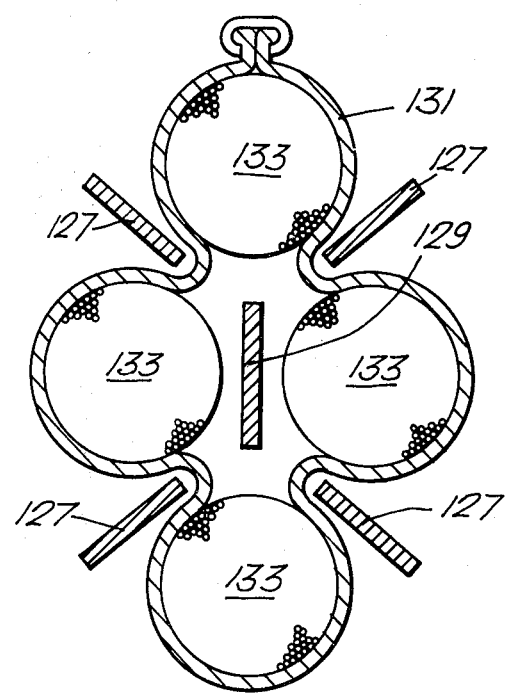

FIGS. 4 and 6 are cross-sections through a sealed, four substrate branch-off employing the thermally conductive member of FIGS. 3 and 5 respectively; and FIGS. 7, 8 and 9 are isometric views of further alternative constructions of thermally conductive member.

Figure 1:
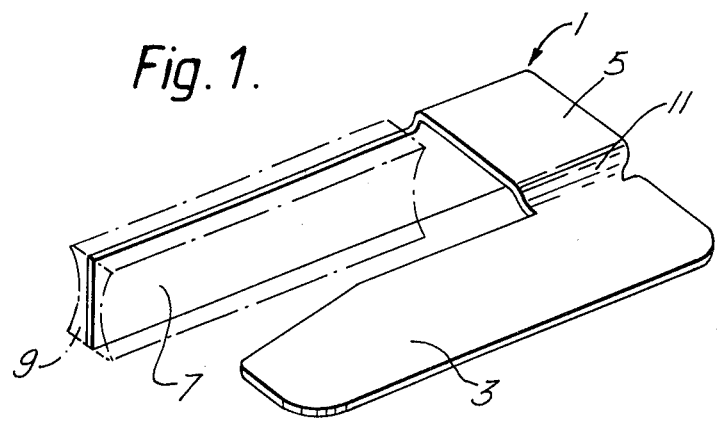
FIG. 1 is an isometric view of a thermally conductive member for use in sealing a branch-off between a recoverable sleeve and at least two substrates.

Referring to FIG. 1, the thermally conductive member, or heat pipe 1 comprises a fin 3 that is thermally connected by a transverse bridge 5 to an elongate plate 7. The plate 7 is coated with hot-melt adhesive 9. The fin 3 extends generally unidirectionally with the plate 7 and lies in a plane that is substantially perpendicular thereto. The heat pipe is pinched at 11 to render the fin 3 readily detachable from the remainder of the heat pipe. The heat pipe is made from a good thermally conductive material such as a metal, for example aluminum.

Figure 2:
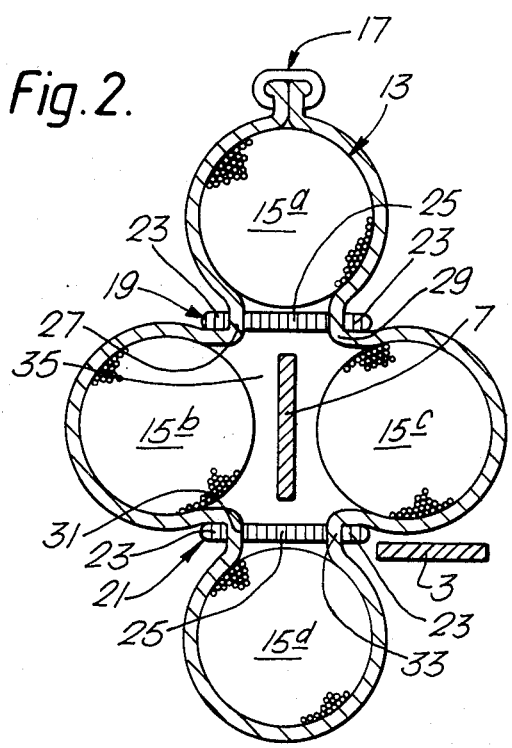
FIG. 2 is a cross-section through a sealed, four-substrate branch-off, employing the thermally conductive member of FIG. 1.

Referring to FIG. 2, a heat recoverable sleeve 13 is wrapped around four multiconductor telecommunications cables, 15. The sleeve 13 is a wraparound sleeve and is retained about the four cables 15 by a rail and channel closure 17 according to British Pat. No. 1155470. The four cable branch-off is sealed using the heat pipe 1 of FIG. 1 in combination with two three-legged clips 19 and 21 that are described and claimed in our co-pending British Application, Publication No. 2019120A. Each of the clips 19 and 21 has two outer legs 23 which extend along the outside of the sleeve 13 and a central, adhesive-coated leg 25 which extends into the sleeve 13. The clip 19 and 21 are positioned over the end of the sleeve 13 in such a way that circumferentially spaced portions 27 and 29, and 31 and 33 of the sleeve are urged towards each other by outer legs 23 of the chips 19 and 21 respectively, so as to divide the interior of the sleeve 13 into three conduits. As can be seen from FIG. 2, two cables, 15b and 15c, are positioned in a central one of the conduits and one cable in each other conduit.

The heat pipe is positioned at the end of the sleeve 13 such that the adhesive-coated plate 7 extends into the gap 35 that exists in the central conduit between the two cables 15b and 15c contained therein. The bridge 5 passes over the sleeve end between cables 15c and 15d such that the fin 3 extends along the outside of the sleeve 13 and is spaced therefrom.

It will be appreciated that the shaping of the heat pipe adhesive 9 is particularly appropriate when inserting the plate 7 into the cable gap 35. Furthermore, the proximity of the adhesive-coated legs 25 of the clips 19 and 21 of the coated plate 7 provides a large mass of adhesive in the vicinity of the branch-off between the cables 15. Accordingly, when heat is applied to recover the sleeve 13, the heat pipe fin 3 directs heat specifically to the gap 35 thereby causing the adhesive mass to melt and flow to fill the entire space within the sleeve end between the cables 15, thereby forming an environmental seal at the branch-off, for example to prevent ingress of water.

The spacing of the fin 3 from the sleeve 13 prevents or at least alleviates scorching and burning of the sleeve.

If desired, the fin 3 may be manually broken off from the remainder of the heat pipe at the pinch 11 preferably after cooling of the branch-off.

It will be appreciated that the particular configuration of chips and heat pipe shown in FIG. 2 illustrate only one embodiment of the present invention and that various other configurations using one or several heat pipes and/or clips may also be used to seal a branch-off, depending on the number of substrates present.

A three substrate branch-off will now be described with reference to FIG. 2. This can be visualised by assuming the presence of cables 15a, b and c only, so that clip 21 is not required and assuming that the portions 31 and 33 of the sleeve 13 are joined directly. The branch-off may then be sealed using the clip 19 and the heat pipe 1, as described above.

A two substrate branch-off will now be described, also with reference to FIG. 2, by assuming the presence of cables 15b and 15c only, so that neither of clips 19 and 21 is required. Sleeve portions 31 and 33 may now be visualised as being joined directly, and the portions 27 and 29 by a rail and channel closure. The branch-off may now be sealed as described above using the heat pipe 1 only. Alternatively, a clip may be used in combination with the heat pipe.

FIG. 3 shows a heat pipe 101 that has two fins 103 and 105 that are connected by respective bridges 107 and 109 to a generally T-shaped inner portion 111. The portion 111 consists of two planar limbs 113, 115 that extend perpendicularly to each other, and the fins 103, 105 are inclined away from the plane of the limb 113.

The inner portion 111 is preferably coated with hot melt adhesive.

FIG. 4 shows a branch-off within a wraparound heat-recoverable polymeric sleeve 117 that encloses four cables 119a,b,c,d. Before recovery of the sleeve 117, the heat pipe 101 is inserted into the end thereof such that the limb 113 separates cable 119a from the other cables and limb 115 separates cable 119b and 119c from each other. The fins 103 and 105 are disposed outside the sleeve, and are spaced from the inner portion 111 by an amount such that the sleeve is clamped by the heat pipe 101 and urged towards conformity with the cable 119a. A three-legged branch-off clip 121, of the same construction as the clip 21 of FIG. 2 is also mounted on the end of the sleeve 117 to urge it into conformity with the cable 119d, such that its central leg 123 is disposed alongside the heat pipe limit 115.

It will be understood that the clip 121 may be mounted on the sleeve 117 before mounting thereon of the heat pipe 101.

To effect sealing of the branch-off of the arrangement of FIG. 4, the sleeve 117 is heated and heat is thereby conducted from the fins 103, 105 to the inner portion limbs 113, 115 so as effectively to direct heat into the crutch of the cables to ensure good sealing in this area.

A heat pipe having the general construction in which the portion for insertion into the sleeve extends in more than one plane, and in particular extends in two planes inclined at an angle to each other such that three substrates are separable thereby, is particularly advantageous in that only one further component, for example a two or three-shaped branch-off clip, is required to provide an effective seal at a branch-off of four substrates. Furthermore, it will be appreciated that such a heat pipe can by itself provide the seal at a three-substrate branch-off.

The heat pipe 125 of FIG. 5 comprises four fins 127 extending angularly in pairs, in generally X-formation, away from opposite edges of an elongate planer inner portion 129, being joined thereto by respective weakened bridges. The heat pipe 125 is shown forming a seal at a four cable branch-off in FIG. 6, whereby no separate clip, such as the clip 21 of FIG. 2, is required. The longitudinal separation of the fins 127 and the inner portion 129 is such that sufficient clamping is provided of a heat recoverable sleeve 131 around cable substrates 133. It will be appreciated that the inner pipe portion 129 is preferably adhesive coated.

FIGS. 7 to 9 show some modified embodiments of a heat pipe that may be used to form a branch-off seal.

The heat pipe 37 of FIG. 7 has a pair of fins 39 that are detachably connected by respective bridges 41 to a single plate 43. The fins 39 are parallel to each other and lie to the same side of and substantially perpendicularly to the plane of the plate 43. The heat pipe 45 of FIG. 8 has a pair of fins 47 that are detachably connected by respective bridges 49 to a single plate 51. The fins 47 are parallel to each other and lie on opposite sides of and substantially perpendicular to the plane of the plate 51. The heat pipe 53 of FIG. 9 has a pair of co-planar fins 55 that are detachably connected by respective bridges 57 to a single plate 59 that extends substantially perpendicularly thereto.

The plates of heat pipes 37, 45 and 53 may be coated with adhesive.

Whilst the clips employed in the embodiments described with reference to FIGS. 2 and 4 are three-legged clips, it is envisaged that two-legged clips, also as described in our co-pending Patent Application Publication No. 2019144A for example, may be used in suitable applications.

The cross-section of the fin-shaped portion and the bridging portion of the thermally conductive member are advantageously substantially equal to maximise the heat conduction to the elongate portion whilst minimising the surface area of the fin shaped portion. Furthermore, the cross-section of the elongate portion is advantageously larger for good heat dispersal.

In certain branch-off applications, sufficient sealing material may be carried by the thermally conductive member to avoid the use of sleeve that is itself internally coated with a sealing material.

The thermally conductive member may advantageously be coated, for example, with black epoxy paint to protect against corrosion and to maximise heat absorption.

A coating of thermochromic paint may be applied to the fin-shaped portion of the member to indicate when sufficient heat has been absorbed to seal the branch-off.

It will be appreciated that the roles of fin and plate may be interchanged so as to provide, for example, a heat pipe having a single fin, outside the sleeve, and two plates extending therewithin.

I claim:

1. An assembly for sealing with a heat-activatable sealant a branch off between at least two substrates, comprising:
   a heat-recoverable sleeve positionable around the substrates, the substrates arranged to define a central crutch region and the substrates extend from one end of the sleeve to the other; and
   a thermally conductive member comprising
      a first generally fin-shaped portion that is positionable outside the sleeve,
      a second elongate portion including a heat-activatable sealant means arranged in use to extend between the substrates in the central crutch and the second elongate portion being severable from the first portion, and
      a thermally-conductive bridging portion that interconnects the first and second portions, wherein heat applied to the first portion is conducted by the bridging portion to the second portion causing at least a portion of the heat-activatable sealant means to become severed and to seal the central crutch region.

2. An assembly according to claim 1, additionally comprising at least another independent clip having two elongate legs that are positionable over the outer surfaces of the sleeve at said end thereof to hold circumferentially spaced portions of the sleeve towards one another to define conduits for receiving at least some of said substrates.

3. An assembly according to claim 2 for forming a branch-off between at least three substrates, wherein said clip has a further leg that is coated with a heat-activatable sealant and is arranged to extend between adjacent substrates.

4. A method of sealing with a heat-activatable sealant a branch-off between at least two substrates extending from an end of a heat-recoverable sleeve and defining a central crutch region, comprising:
   positioning a thermally-conductive member as set forth in claim 1 at the end of the sleeve such that the first fin-shaped portion of the member is located outside the sleeve and the second portion extends within the sleeve between the substrates at the central crutch region; and applying heat to the first portion whereupon heat is conducted to the second portion through the thermally-conductive bridging portion causing the heat-activatable sealant means to fail and flow into the crutch region for sealing the branch-off.

5. A method according to claim 4, in which said thermally conductive member has at least two fin-shaped portions, and wherein the method includes the step of positioning each of said two fin-shaped portions outside said sleeve such that circumferentially spaced portions of the sleeve are held towards each other between two of said substrates.

6. A method as claimed in claim 1, additionally comprising the step of positioning a clip, having at least two elongate legs, over the outer surface of the sleeve at said end such that said legs hold circumferentially-spaced portions of the sleeve towards each other between two of said substrates.

7. A method as claimed in claim 1, wherein a branch-off is formed between at least four of said substrates, wherein the thermally conductive member comprises two of said fin-shaped portions and the second portion comprises two limbs extending at an angle to each other; the method comprising positioning the thermally conductive member at said end of the sleeve with the limbs extending into the sleeve so as to separate three of the substrates from each other, and positioning the clip at said sleeve end with the two legs extending over the outer-surface of the sleeve such that the clip maintains circumferentially spaced portions of the sleeve towards each other thereby to separate said three substrates from the fourth substrates.

8. A branch-off seal between a recovered sleeve and at least two substrates, formed according to a method according to claim 4.

* * * * *

UNITED STATES PATENT AND TRADEMARK OFFICE
CERTIFICATE OF CORRECTION

PATENT NO. : 4,410,379
DATED : October 18, 1983
INVENTOR(S) : Joris R. I. Franckx It is certified that error appears in the above-identified patent and that said Letters Patent are hereby corrected as shown below:

In Claim 6, line 1, "claim 1" should read --claim 5--.

In Claim 7, line 1, "claim 1" should read --claim 5--.

Signed and Sealed this

Fifth Day of June 1984

[SEAL]

Attest:

*Attesting Officer*

GERALD J. MOSSINGHOFF
*Commissioner of Patents and Trademarks*

UNITED STATES PATENT AND TRADEMARK OFFICE
CERTIFICATE OF CORRECTION

PATENT NO. : 4,410,379
DATED : October 18, 1983
INVENTOR(S) : Joris R. I. Franckx It is certified that error appears in the above-identified patent and that said Letters Patent is hereby corrected as shown below:

On the first page of the patent immediately following the line "(22) filed: October 15, 1981", the following should appear:

-- (30)   Foreign Application Priority Data

October 29, 1980 (GB) United Kingdom ....34755--.

Signed and Sealed this

Fifteenth Day of April 1986

[SEAL]

Attest:

Attesting Officer

DONALD J. QUIGG

Commissioner of Patents and Trademarks